(12) United States Patent
Milicevic et al.

(10) Patent No.: US 8,402,792 B2
(45) Date of Patent: Mar. 26, 2013

(54) INTERNAL VAPOUR DEPOSITION PROCESS

(75) Inventors: Igor Milicevic, Helmond (NL); Mattheus Jacobus Nicolaas Van Stralen, Tilburg (NL); Johannes Antoon Hartsuiker, Eindhoven (NL); Eugen Aldea, Eindhoven (NL)

(73) Assignee: Draka Comteq B.V. (NL)

( * ) Notice: Subject to any disclaimer, the term of this patent is extended or adjusted under 35 U.S.C. 154(b) by 0 days.

(21) Appl. No.: 13/082,076

(22) Filed: Apr. 7, 2011

(65) Prior Publication Data
US 2011/0247368 A1  Oct. 13, 2011

(30) Foreign Application Priority Data
Apr. 13, 2010 (NL) ...................................... 2004544

(51) Int. Cl.
*C03B 37/018* (2006.01)
(52) U.S. Cl. .................. 65/417; 65/391; 65/397; 65/398
(58) Field of Classification Search .................... 65/391, 65/397, 398, 417
See application file for complete search history.

(56) References Cited

U.S. PATENT DOCUMENTS

| | | |
|---|---|---|
| 4,493,721 A | 1/1985 | Auwerda et al. |
| 4,714,589 A | 12/1987 | Auwerda et al. |
| 4,741,747 A | 5/1988 | Geittner et al. |
| 4,844,007 A | 7/1989 | Eikelboom |
| 4,877,938 A | 10/1989 | Rau et al. |
| 5,504,829 A | 4/1996 | Evans et al. |
| 2003/0056549 A1* | 3/2003 | de Sandro et al. ............... 65/420 |
| 2003/0159781 A1 | 8/2003 | Van Stralen et al. |
| 2003/0172681 A1* | 9/2003 | Guskov et al. .................. 65/391 |

(Continued)

FOREIGN PATENT DOCUMENTS

| | | |
|---|---|---|
| JP | A-56-104735 | 8/1981 |
| JP | A-2000-327360 | 11/2000 |

(Continued)

OTHER PUBLICATIONS

U.S. Appl. No. 12/642,784, filed Dec. 19, 2009 in the name of Igor Milicevic.

(Continued)

*Primary Examiner* — Queenie Dehghan
(74) *Attorney, Agent, or Firm* — Shumaker, Loop & Kendrick, LLP

(57) ABSTRACT

A method for manufacturing a primary preform for optical fibers using an internal vapor deposition process, including the steps of: i) providing a hollow glass substrate tube having a supply side and a discharge side, ii) surrounding at least part of the hollow glass substrate tube by a furnace, iii) supplying doped or undoped glass-forming gases to the interior of the hollow glass substrate tube via the supply side thereof, iv) creating a reaction zone in which conditions such that deposition of glass will take place on the interior of the hollow glass tube are created, and v) moving the reaction zone back and forth along the length of the hollow glass substrate tube between a reversal point located near the supply side and a reversal point located near the discharge side of the hollow glass substrate tube, wherein, during at least part of step v), the gas flow comprises a first concentration of fluorine-containing compound when the reaction zone is moving in the direction of the discharge side.

13 Claims, 2 Drawing Sheets

U.S. PATENT DOCUMENTS

| | | | |
|---|---|---|---|
| 2004/0109656 A1* | 6/2004 | Aikawa et al. | 385/127 |
| 2005/0000253 A1 | 1/2005 | Xie et al. | |
| 2005/0013570 A1* | 1/2005 | Guan et al. | 385/124 |
| 2005/0041943 A1 | 2/2005 | Milicevic et al. | |
| 2005/0081566 A1 | 4/2005 | Simons et al. | |
| 2005/0120751 A1 | 6/2005 | Simons et al. | |
| 2005/0172902 A1 | 8/2005 | Van Stralen et al. | |
| 2007/0289532 A1 | 12/2007 | Hartsuiker et al. | |
| 2008/0044150 A1 | 2/2008 | Terpsma et al. | |
| 2008/0053812 A1 | 3/2008 | Higashitani et al. | |
| 2009/0004404 A1 | 1/2009 | Hartsuiker et al. | |
| 2011/0138861 A1* | 6/2011 | Homa et al. | 65/398 |

FOREIGN PATENT DOCUMENTS

| | | |
|---|---|---|
| NL | 1037164 | 2/2011 |

OTHER PUBLICATIONS

Written Opinion dated Feb. 3, 2011 issued in Dutch Patent Application No. 2004544.

European Search Report dated Jul. 19, 2011 issued in European Patent Application No. 11161434.3.

* cited by examiner

INTERNAL VAPOUR DEPOSITION PROCESS

The present invention relates to a method for manufacturing a primary preform for optical fibres using an internal vapor deposition process, comprising the steps of:

i) providing a hollow glass substrate tube having a supply side and a discharge side, ii) surrounding at least part of the hollow glass substrate tube by a furnace, iii) supplying doped or undoped glass-forming gases to the interior of the hollow glass substrate tube via the supply side thereof, iv) creating a reaction zone in which conditions such that deposition of glass will take place on the interior of the hollow glass tube are created, and v) moving the reaction zone back and forth along the length of the hollow glass substrate tube between a reversal point located near the supply side and a reversal point located near the discharge side of the hollow glass substrate tube, wherein, during at least part of step v), the gas flow comprises a first concentration of fluorine-containing compound when the reaction zone is moving in the direction of the discharge side.

The present invention further relates to a method for manufacturing a final preform for optical fibres.

The present invention further relates to a method for manufacturing an optical fibre.

Such a method is known per se from U.S. patent application US 2005/0000253. More in particular, said patent application discloses an internal vapor deposition process according to the PCVD technology, wherein a glass substrate tube is partially or completely surrounded by a resonant cavity along its cylindrical axis, and wherein a gas mixture comprising $O_2$, $SiCl_4$, $GeCl_4$ is supplied to the substrate tube. In said resonant cavity a local plasma is produced, causing a reaction between the components of the gas mixture inside the substrate tube, forming $SiO_x$ mainly doped with germanium. The resonant cavity moves back and forth along the cylindrical axis of the substrate tube, so that said tube is internally coated with glass layers. Said U.S. patent application further discloses the possibility to add freon ($C_2F_6$) to the gas mixture thus to reduce the formation of hydroxyl groups in the deposited glass.

JP 56-104735 relates to a method for manufacturing a preform for optical fibres for infrared rays.

US 2009/0004404 relates to a method for manufacturing a preform for optical fibres by an internal deposition process.

US 2005/0081566 relates to a method for manufacturing a rod shaped preform, in which method at the end of the deposition process the amount of fluor compound that is supplied to the interior of the substrate tube is increased by a value of at least 10%.

An optical fibre consists of a core and an outer layer surrounding said core, which outer layer is also referred to as "cladding".

The core of an optical fibre may be made of one or more different concentric layers, depending on the required optical properties. At least part of the core usually has a higher refractive index than the cladding, so that light can be transported through the optical fibre, mainly through the core thereof.

For an optical fibre made of glass, the higher refractive index of the core can be obtained by doping the glass of the core with a refractive index-increasing dopant, such as germanium, for example. In the glass, germanium is mainly present as $GeO_2$. It is also possible to doped the core with a refractive index-increasing dopant as well as with a refractive index-decreasing dopant, in which case the relative proportions of said dopants are set so that the required refractive index is obtained. In particular fluorine is used as a refractive index-decreasing dopant.

During the transport of light through the optical fibre, several factors cause the signal strength (optical capacity) to decrease. Said decrease is referred to as "attenuation" and can expressed in a attenuation coefficient dB/km.

A first cause of attenuation is so-called Rayleigh scattering, which depends in particular on the amount and the type of dopants in the core of the optical fibre. Because of said Rayleigh scattering, a light signal being transported through an optical fibre comprising a relatively high amount of germanium dopant in the core will be attenuated more strongly than a light signal being transported through an optical fibre comprising a relatively low amount of germanium dopant.

The degree to which Rayleigh scattering takes place furthermore depends on the wavelength. More in particular, the degree of Rayleigh scattering is proportional to $\lambda^{-4}$, wherein $\lambda$ is the wavelength. Rayleigh scattering caused by germanium doping is moreover several times stronger than Rayleigh scattering caused by fluorine doping.

A second cause of attenuation is the presence of impurities in the glass, which impurities absorb light at one or more specific wavelengths. In particular the presence of hydroxyl groups, mainly present as SiOH or GeOH in the optical fibre, is important, because at least one absorption wavelength is within the wavelength range in which optical fibres, in particular single mode optical fibres, are used. More in particular, an absorption peak is observed at a wavelength of about 1385 nm. Said absorption peak is also referred to as water peak or water attenuation.

The maximum length over which an optical signal can be transported by an optical fibre without being amplified depends on and is limited by, among other factors, the degree to which the optical signal is attenuated.

Consequently there is a need for optical fibres in which the amount of impurities, in particular hydroxyl groups, is minimised.

Furthermore there is a need for optical fibres in which the attenuation caused by Rayleigh scattering is minimised.

It is an object of the present invention to provide a method for manufacturing a primary preform for optical fibres, using an internal vapor deposition process, in which it is possible to influence the amount of hydroxyl groups that is incorporated during the vapor deposition process.

Another object of the present invention is to provide a method for manufacturing a primary preform for optical fibres, using an internal vapor deposition process, wherein the optical fibre manufactured on the basis of the primary preform exhibits less attenuation at a wavelength of 1385 nm, and wherein the Rayleigh scattering is not adversely affected.

Yet another object of the present invention is to provide a method for manufacturing a primary preform for optical fibres, using an internal vapor deposition process, wherein the optical fibre manufactured on the basis of the primary preform exhibits less Rayleigh attenuation and wherein the attenuation at a wavelength of 1385 nm is not adversely affected.

Another object of the present invention is to provide a method for manufacturing a primary preform for optical fibres, using an internal vapor deposition process, wherein it is possible to influence the incorporation of hydroxyl groups in the deposited glass as a function of the position in the longitudinal direction of the hollow glass substrate tube.

The present invention as described in the introduction is characterised in that the gas flow comprises a second concentration of fluorine-containing compound upon movement of the reaction zone in the direction of the supply side following movement thereof in the direction of the discharge side, wherein the first concentration of fluorine-containing compound is different from the second concentration of fluorine-containing compound during at least part of step v).

The present inventors have surprisingly found that in addition to the concentration of fluorine-containing compound in the gas flow, also the direction of movement of the reaction zone during the internal vapor deposition process has an influence on the degree to which the fluorine-containing compound influences the number of hydroxyl groups in the deposited glass.

More in particular the inventors have found that, using a prior art method, i.e. using identical first and second concentrations of fluorine-containing compound in the gas flow, the number of hydroxyl groups in the deposited glass is reduced more strongly when the reaction zone is moving in the direction of the discharge side than when the direction zone is moving in the direction of the supply side. It is thus assumed that there is a difference in the degree of efficiency with which the fluorine-containing compound reduces the formation of hydroxyl groups in the deposited glass.

The present inventors have moreover found that the variation in the amount of hydroxyl groups incorporated in the deposited glass differs as a function of the position in the longitudinal direction of the hollow glass substrate tube. More in particular, it was observed that the amount of hydroxyl groups varies from high near the supply side to low near the discharge side in the embodiment in which fluorine-containing compound is only added when the reaction zone is moving in the direction of the discharge side.

It was furthermore observed that the amount of hydroxyl groups varies from low near the supply side to high near the discharge side in the embodiment in which fluorine-containing compound is only added when the reaction zone is moving in the direction of the supply side.

Using a prior art method, i.e. using identical concentrations of fluorine-containing compound in the gas flow, the present inventors were unable to observe a difference between the amount of fluorine being incorporated as a dopant in the deposited glass upon movement of the reaction zone in the direction of the discharge side and the amount of fluorine being incorporated in the deposited glass as a dopant upon movement of the reaction zone in the direction of the supply side.

These observations have led to the present invention, which makes it possible to reduce the amount of fluorine that is incorporated in the deposited glass in the deposited glass, without this having an adverse effect on the amount of hydroxyl groups in the deposited glass. More in particular, it is possible, using an unchanged amount of hydroxyl groups, to obtain a reduced amount of fluorine dopant in the deposited glass by making use of the difference in efficiency with which the fluorine-containing compound reduces the formation of hydroxyl groups in the deposited glass.

A reduced amount of fluorine dopant in the deposited glass results in a smaller decrease of the refractive index of the deposited glass. Thus it becomes possible to reduce the amount of refractive index-increasing dopant, such as germanium, that is needed to obtain a required refractive index. This makes it possible to reduce the Rayleigh scattering, and thus the attenuation of an optical signal in the optical fibre.

In addition, the aforesaid observations have led to the perception that the present invention makes it possible to reduce the total amount of hydroxyl groups in the deposited glass without this having an adverse effect on the attenuation of an optical signal in a final optical fibre caused by Rayleigh scattering. More in particular, the present inventors have realised that it is possible, given an constant Rayleigh scattering, to reduce the water peak, i.e. the attenuation at a wavelength of 1385 nm.

Finally, the present inventors have realised that the present invention makes it possible to influence the variation of the amount of hydroxyl groups in the deposited glass along the length of the primary preform.

Thus one or more of the above objects are accomplished by implementing the invention.

In a preferred embodiment, the first concentration of fluorine-containing compound is higher than the second concentration of fluorine-containing compound. The present inventors have found that in such an embodiment the number of incorporated hydroxyl groups is reduced more strongly in comparison with an embodiment in which the first concentration of fluorine-containing compound is lower than the second concentration.

In a specific embodiment, said first and said second concentration of fluorine-containing compound are set so that the total amount of fluorine-containing compound that is supplied to the hollow glass substrate tube during a so-called stroke remains the same in comparison with a prior art method, in which the concentration of fluorine-containing compound in the gas flow is the same for both directions of movement of the reaction zone. The term "stroke" is to be understood to mean one back-and-forth movement of the reaction zone, starting from and ending at the reversal point near the supply side.

Using an unchanged total amount of fluorine-containing compound during a stroke, no discernible influence on the refractive index of the deposited glass can be observed, but the amount of hydroxyl groups in the deposited glass will nevertheless be reduced.

In another preferred embodiment, the fluorine-containing compound is free of hydrogen atoms and is preferably selected from the group consisting of the compounds $CF_4$, $C_2F_6$, $C_4F_6$, $CCl_2F_2$, $SiF_4$, $Si_2F_6$, $SF_6$, $NF_3$, $F_2$ or a mixture of two or more of these compounds. In a specific embodiment, the fluorine-containing compound is $C_2F_6$ or $C_4F_6$ or a mixture thereof.

In a preferred embodiment, the gas flow further comprises at least one dopant selected from the group consisting of germanium, nitrogen, boron, titanium, phosphorus and aluminium. When incorporated in the glass, said dopant increase the refractive index. Consequently, the refractive index-decreasing effect of fluorine can be offset by the presence of one or more of the above refractive index-increasing dopants.

Germanium will mainly be present as $GeO_2$ in the deposited glass. The germanium dopant can be added to the gas flow in the form of $GeCl_4$, for example.

Nitrogen will mainly be present as SIO—N in the deposited glass. The nitrogen dopant can be added to the gas flow in the form of $N_2$.

Titanium will mainly be present as $TiO_2$ in the deposited glass. The titanium dopant can be added to the gas flow in the form of $TiCl_4$.

Phosphorus will mainly be present as $P_2O_3$ in the deposited glass. The phosphorus dopant can be added to the gas flow in the form of $POCl_3$.

Aluminium will mainly be present as $Al_2O_3$ in the deposited glass. The aluminium dopant can be added to the gas flow in the form of $AlCl_3$.

In a special embodiment, the first and/or the second concentration of fluorine-containing compound in the gas flow is/are set so that the refractive index of the deposited glass is reduced by less than $4\times10^{-3}$, preferably less than $2\times10^{-3}$. The present inventors have found that the effect of the direction of movement of the reaction zone on the incorporation of hydroxyl groups diminishes when relatively high concentrations of fluorine-containing compound are used, i.e. concentrations that lead to a decrease of the refractive index by more than $4\times10^{-3}$.

A decrease of the refractive index of $4\times10^{-3}$ corresponds to a concentration of about $11.3\times10^{-3}$ percent by weight (wt. %) fluorine in the deposited glass.

In another special embodiment, the first concentration of fluorine-containing compound in the gas flow is set so that the refractive index of the deposited glass is decreased by more than $0.1\times10^{-3}$. A decrease of the refractive index of $0.1\times10^{-3}$ corresponds to a concentration of about $0.3\times10^{-3}$ percent by weight (wt. %) fluorine in the deposited glass.

The skilled person can determine by experiment which concentration of fluorine-containing compound in the gas flow is necessary in order to effect a required decrease of the refractive index. To that end he will select a first setting of the concentration, produce a primary preform comprising a fluorine-doped glass layer and an undoped glass layer, i.e. pure quartz glass, and subsequently measure the refractive index of the two layers, using a preform analyser. If the difference in the refractive index between the fluorine-doped class layer and the undoped glass layer does not correspond to the required value, he will thus need to adapt the concentration of fluorine-containing compound upon producing a next primary preform. The skilled person can thus relate the concentration of fluorine-containing gas to the decrease of the refractive index that will be obtained.

In another special embodiment, the proportion R, viz. the quotient of the first concentration of fluorine-containing compound and the second concentration of fluorine-containing compound in the gas flow, is set so that the proportion R is within the range 1<R<100, preferably 1<R<10.

In another preferred embodiment, the proportion R is within the range 1.5<R<10, preferably 1.5<R<3.

The use of this special embodiment implies that the first and the second concentration of fluorine-containing compound are unequal to zero.

In a specific embodiment, no fluorine-containing compound is added to the hollow glass substrate tube upon movement of the reaction zone in the direction of the supply side. In this specific embodiment the second concentration equals zero, therefore.

Preferably, the internal vapor deposition process according to the present invention is of the PCVD type.

In a specific embodiment, the reaction zone in step iv) is a plasma, preferably a microwave plasma.

In another embodiment, the reaction zone moves at a speed of 5-40 meters per minute (m/min), preferably 15-25 meters per minute, especially 15-30 m/min, in step v).

In another specific embodiment, the furnace is set at a temperature of 800-1200° C., preferably 900-1100° C., in step v).

In another specific embodiment, the furnace comprises one or more temperature zones, which can be set at different temperatures, possibly independently of each other. In addition, the temperature in one or more temperature zones may vary during the internal vapor deposition process.

An internal vapor deposition process of the PCVD type, in which the furnace comprising several temperature zones is used, is described in Dutch patent application No. 1037163, which was not open to public inspection yet at the time of the filing of the present application.

An internal vapor deposition process of the PCVD type, in which the temperature of the furnace is varied during the deposition process, is described in Dutch patent application No. 1037164, which was not open to public inspection yet at the time of the filing of the present application.

The methods according to the aforesaid two Dutch patent applications are specifically incorporated herein by reference.

The present invention further relates to a method for manufacturing a final preform for optical fibres, comprising the steps of:

i) manufacturing a primary preform according to the present invention, and subsequently ii) collapsing the primary preform obtained in step i) into a solid primary preform, using a heat source, iii) optionally depositing an additional amount of glass on the exterior of the solid primary preform so as to form the final preform.

The present invention further relates to a method for manufacturing an optical fibre, comprising the manufacturing of the final preform, which method comprises the following steps:

i) manufacturing a primary preform according to the present invention, and subsequently ii) collapsing the primary preform obtained in step i) into a solid primary preform, using a heat source, iii) optionally applying an additional amount of glass to the exterior of the solid primary preform so as to form the final preform, and subsequently iv) heating one end of the final preform obtained in step iii) and drawing the optical fibre from the final preform.

In a special embodiment of the method according to the present invention, the concentration of fluorine-containing compound in the gas flow is varied during the movement of the reaction zone in the direction of one or both reversal points. In such an embodiment, the terms "first" and "second" concentration are to be understood to be the average values for the concentration during the direction of movement in question.

The present invention will now be explained in more detail with reference to a number of figures and examples, in which connection it should be noted, however, that the present invention is by no means limited thereto.

Figure 1:
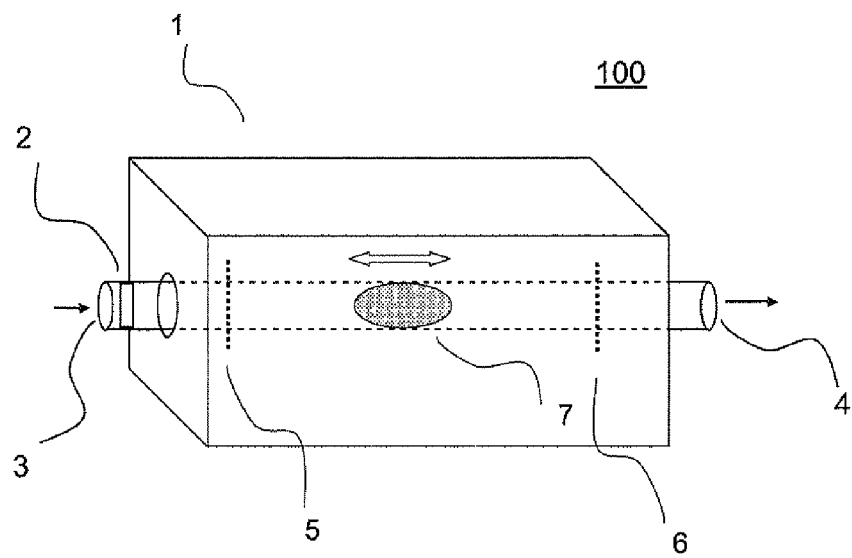
FIG. 1 is a schematic representation of a device for carrying out an internal vapor deposition process.

FIG. 1 schematically shows a device 100 for carrying out an internal vapor deposition process for manufacturing a primary preform for optical fibres. The device 100 comprises a furnace 1, which surrounds at least part of a hollow glass substrate tube 2. The hollow glass substrate tube 2 has a supply side 3 and a discharge side 4. The supply side 3 and the discharge side 4 can be positioned between a gas inlet and a gas outlet, respectively (not shown). The supply side 3 and the discharge side 4 may be clamped in a cylindrical passage provided with an O-ring seal, so that the internal volume of the hollow glass substrate tube 2 is isolated from the outside atmosphere. Such a construction makes it possible to carry out an internal vapor deposition process at a reduced pressure when a pump (not shown) is connected to the gas outlet.

FIG. 1 furthermore schematically shows a reaction zone 7, which reaction zone 7 moves back and forth during the internal vapor deposition process between a reversal point 5 located near the supply side 3 and a reversal point 6 located near the discharge side 4. The distance between the two reversal points is the stroke length, i.e. the length along which glass layers are deposited on the interior of the hollow glass substrate tube 2. The two reversal points are surrounded by a furnace 1.

During the internal vapor deposition process, doped or undoped glass-forming gases are supplied to the hollow glass substrate tube 2 via the supply side 3. In the reaction zone 7, said glass-forming gases are converted into glass, which is deposited on the interior of the hollow glass substrate tube 2. Thus, a number of glass layers can be deposited on the interior of the hollow glass substrate tube 2 by causing the reaction zone to move back and forth during the internal vapor deposition process. The reaction zone 7 has a specific deposition width (not shown), seen in the longitudinal direction of the hollow glass substrate tube 2, which deposition width is at least 2 times, preferably at least 3 times, preferably at least 4 times smaller than the stroke length. The stroke length can be for example 1.3 m. The deposition width can be in the range of 30 cm-10 cm, especially 25-15 cm.

The present invention is in particular suitable for an internal vapor deposition process of the PCVD type, in which microwaves are coupled into the interior of the hollow glass substrate tube 2, so as to form a local plasma, via a resonance cavity (also called resonator) which partially surrounds the hollow glass substrate tube 2, seen in the longitudinal direction thereof. The phrase "local plasma" is understood to mean a plasma having a length which more or less corresponds to the length of the resonator, both seen in the longitudinal direction of the hollow glass substrate tube 2. Te resonance cavity is moved back and forth along the length of the hollow glass substrate tube 2 between the two reversal points 5, 6 in a PCVD process.

A PCVD process is known in the art, for example from U.S. patent applications Nos. 2005/0000253, US 2008/0044150, US 2005/0120751, US 2008/0053812, US 2005/0041943 and U.S. Pat. Nos. 4,741,747 and 4,493,721.

Resonators are known in the art, for example from U.S. patent applications published under Nos. US 2007/0289532, US 2003/0159781 and US 2005/0172902, and U.S. Pat. Nos. 4,844,007, 4,714,589 and 4,877,938.

The PCVD process is a so-called low-pressure process, which means that the pressure is set at a value of 1-40 mbar, preferably 5-30 mbar, during the internal vapor deposition process.

Figure 2:
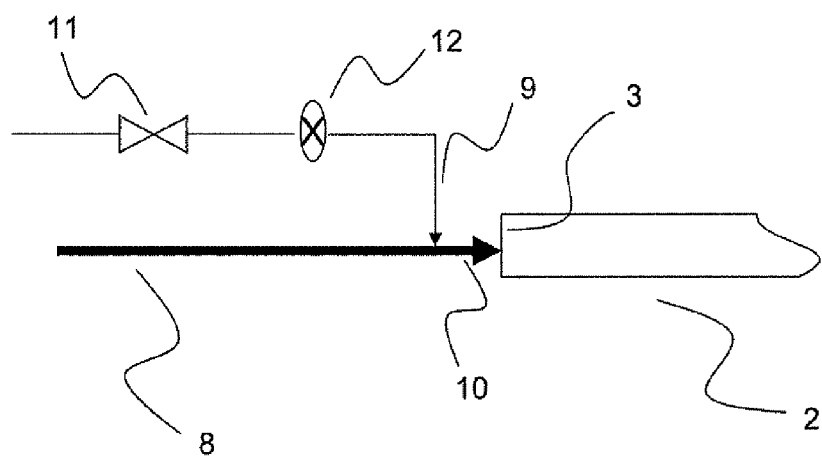
FIG. 2 is a schematic representation of a device suitable for carrying out the present invention

FIG. 2 schematically shows a preferred embodiment of a device for carrying out the method according to the present invention. A gas flow 10 being supplied on the supply side 3 of the hollow glass substrate tube 2 is a combination of a main gas flow 8 and a subsidiary glass flow 9. The main gas flow 8 comprises the doped or undoped glass-forming gases. The main gas flow 8 optionally comprises a first flow of fluorine-containing compound.

A second flow of fluorine-containing compound can be added during the internal vapor deposition process by means of the subsidiary gas flow 9. In the conduit through which the subsidiary gas flow 9 is transported, a valve 11, preferably a binary valve, can be switched to the "open" or "closed" position. Thus it is possible to add a subsidiary gas flow 9 to the main gas alone 8.

Using the device that is schematically shown in FIG. 2, it is possible to switch between a gas flow 10 consisting only of the main gas flow 8 and a gas flow 10 consisting of a combination of the main gas flow 8 and the subsidiary gas flow 9. Using the device that is schematically shown in FIG. 2, it is thus possible to switch between a first concentration of fluorine-containing compound in the gas flow 10 corresponding to the concentration resulting from the optional first flow of fluorine-containing compound in the main gas flow 8, and a second concentration of fluorine-containing compound corresponding to the concentration of fluorine-containing compound resulting from combining the main gas flow 8 with the subsidiary gas flow 9.

Setting the flow of fluorine-containing compound, and thus the concentration in the gas flow 10, can be done in a quick and precise manner by adjusting the gas pressure behind the valve 11, seen in upstream direction, and the size of the passage 12. In FIG. 2, the valve 11 and the passage 12 are shown some distance apart. It is preferable, however, to dispose the valve 11 and the passage 12 as close together as possible or to integrate them together.

In FIG. 2 the subsidiary gas flow 9 is represented as consisting of a single conduit comprising a valve 11 and a passage 12. It is also possible, however, to use a number of conduits connected in parallel, each comprising a binary valve and a passage, so that the flow of fluorine-containing compound in the subsidiary glass flow 9 and thus the concentration thereof in the gas flow 10 can be set at different levels.

Preferably, the volume of the conduit through which the subsidiary gas flow 9 is transported between the valve 11 and the supply side 3 of the hollow glass substrate tube 2 is as small as possible.

In a practical embodiment, a conduit having a length of at most 1.0 m and a diameter of ¼ inch, corresponding to 6.35 mm, is used. The subsidiary gas flow 9 is preferably added to the main gas flow 8 at a location as close to the supply side 3 as possible. It is also possible to supply the subsidiary gas flow 9 directly to the supply side 3.

A system comprising binary valves which is suitable for carrying out the method according to the present invention is described in U.S. patent application Ser. No. 12/642,784, which was not open to public inspection yet at the time of the filing of the present application.

Although a device as schematically shown in FIG. 2 is to be preferred, the present invention is by no means limited to such an embodiment. It is also possible to use an adjustable valve or a flow controller instead of the binary valve 11 and the passage 12. It is furthermore also possible to use only one gas flow, viz. the main gas flow 8, in which case the concentration of fluorine-containing compound in the main gas flow 8 is varied as a function of the direction of movement of the reaction zone.

EXAMPLE 1

Five primary preforms for gradient index multimode optical fibres were produced, using a PCVD-type internal vapor deposition process, by means of the device that is schematically shown in FIG. 1 and FIG. 2.

During the internal vapor deposition process an amount of fluorine-containing compound, more in particular $C_2F_6$, was supplied to the hollow glass substrate tube 2 only during movement of the reaction zone 7 in the direction of the discharge side 4. This was effected by putting the valve 11 in the "closed" position upon movement of the reaction zone in the direction of the supply side 3 and in the "open" position upon movement of the reaction zone 7 in the direction of the discharge side 4. The gas flow 8 did not comprise any fluorine-containing compound.

To form a solid primary preform, each of the five hollow glass substrate tubes with the glass layers deposited therein was collapsed, using a heat source, after completion of the internal vapor deposition process.

Using a preform analyser, the radial refractive index profile was subsequently determined at a few positions along the length of each solid primary preform. The term "radial refractive index profile" is to be understood to mean a representation of the refractive index as a function of the radial position in a (primary) preform or an optical fibre.

Subsequently, an additional layer of glass was deposited on the solid primary preform, using a plasma overcladding technique, in which natural silica powder was deposited on the exterior of the primary preform and vitrified, using a plasma burner.

From each final preform thus obtained a gradient index multimode optical fibre was drawn. The optical fibre thus drawn, which had a total length of about 200 km, was divided into a number of smaller parts (optical fibres), and the attenuation (expressed in the attenuation coefficient) at a wavelength of 1385 nm of each of said parts was determined.

EXAMPLE 2

Five primary preforms for gradient index multimode optical fibres were produced, using a PCVD-type internal vapor deposition process, by means of the device that is schematically shown in FIG. 1 and FIG. 2.

During the internal vapor deposition process an amount of fluorine-containing compound, more in particular $C_2F_6$, was supplied to the hollow glass substrate tube 2 only during movement of the reaction zone 7 in the direction of the supply side 3. This was effected by putting the valve 11 in the "closed" position upon movement of the reaction zone in the direction of the discharge side 4 and in the "open" position upon movement of the reaction zone 7 in the direction of the supply side 3. The gas flow 8 did not comprise any fluorine-containing compound. In Example 2, the concentration of fluorine-containing compound in the gas flow 8 upon movement of the reaction zone in the direction of the supply side was set at the same value as the concentration upon movement of the reaction zone in the direction of the discharge side in Example 1.

To form a solid primary preform, each of the five hollow glass substrate tubes with the glass layers deposited therein was collapsed, using a heat source, after completion of the internal vapor deposition process.

Using a preform analyser, the radial refractive index profile was subsequently determined at a few positions along the length of each solid primary preform.

Subsequently, an additional layer of glass was deposited on the solid primary preform, using a plasma overcladding technique, in which natural silica powder was deposited on the exterior of the primary preform and vitrified, using a plasma burner.

The concentration of fluorine-containing compound in the gas flow 10 according to Example 2 was set at the same value as the concentration of fluorine-containing compound in the gas flow 10 according to Example 1.

From each final preform thus obtained a gradient index multimode optical fibre was drawn. The optical fibre thus drawn, which had a total length of about 200 km, was divided into a number of smaller parts (optical fibres), and the attenuation (expressed in the attenuation coefficient) at a wavelength of 1385 nm of each of said parts was determined.

The five primary preforms according to Example 1 and the five primary preforms according to Example 2 were produced in turns.

The present inventors did not observe a difference in the radial refractive index profile between solid primary preforms manufactured according to Example 1 and solid primary preforms manufactured according to Example 2. The present inventors conclude from this that the amount of fluorine incorporated in the deposited glass as a dopant does not depend on the direction of movement of the reaction zone.

Figure 3:
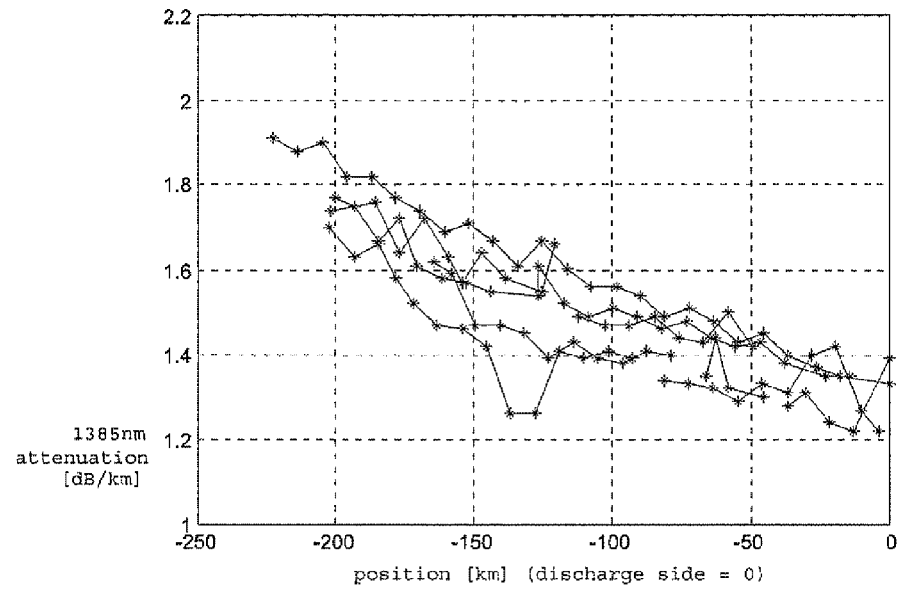
FIG. 3 is a view showing the attenuation at 1385 nm for optical fibres manufactured on the bases of primary preforms according to an embodiment of the present invention.

FIG. 3 is a view showing the attenuation at 1385 nm measured on optical fibres manufactured according to Example 1.

The vertical axis shows the attenuation coefficient expressed in dB/km.

The horizontal axis shows the position in the drawn optical fibre, expressed in kilometers. A position "0" corresponds to the position of the reversal point 6 near the discharge side 4 of the hollow glass substrate tube 2 during the internal vapor deposition process.

Thus it can be clearly discerned in FIG. 3 that the attenuation of the optical fibres shows a decrease from position −200 to position 0. From this it follows that the amount of hydroxyl groups in the optical fibre shows a decrease from position −200 to position 0. The present inventors therefore conclude that the amount of hydroxyl groups that is incorporated in the deposited glass shows a decrease in the direction of the discharge side 4 of the hollow glass substrate tube 2 during the internal vapor deposition process according to Example 1.

Figure 4:
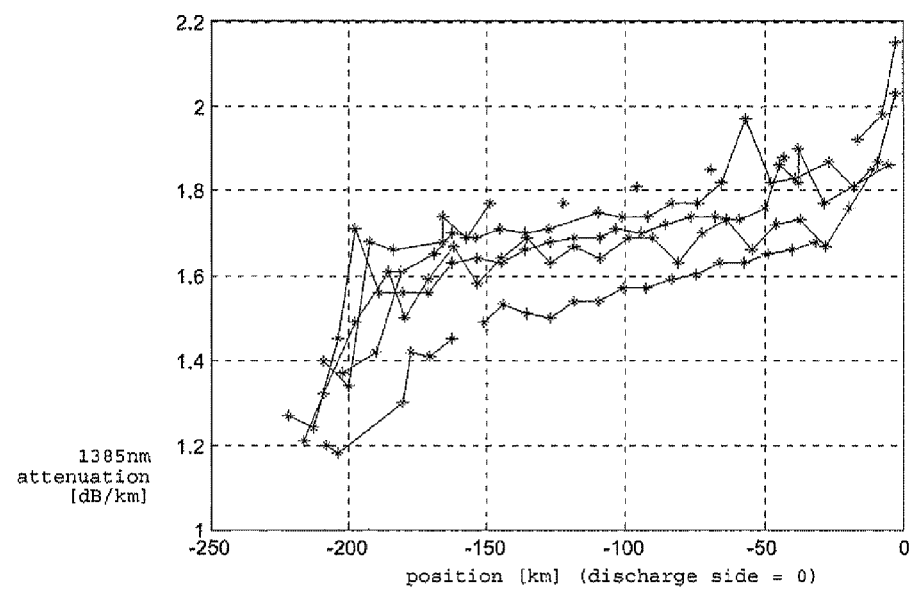
FIG. 4 is a view showing the attenuation at 1385 nm for optical fibres manufactured on the bases of primary preforms according to an embodiment of the present invention.

FIG. 4 is a view showing the attenuation at 1385 nm measured on optical fibres manufactured according to Example 2.

The vertical axis shows the attenuation coefficient expressed in dB/km.

The horizontal axis shows the position in the drawn optical fibre, expressed in kilometers. A position "0" in the optical fibre corresponds to the position of the reversal point 6 near the discharge side 4 of the hollow glass substrate tube 2 during the internal vapor deposition process.

Thus it can be clearly discerned in FIG. 4 that the attenuation of the optical fibres at a wavelength of 1385 nm shows an increase from position −200 to position 0. From this it follows that the amount of hydroxyl groups in the optical fibre shows an increase from position −200 to position 0. The present inventors conclude from this that the amount of hydroxyl groups that is incorporated in the deposited glass shows an increase in the direction of the discharge side of the hollow glass substrate tube during the internal vapor deposition process according to Example 2.

From FIGS. 3 and 4 it follows that the attenuation of optical fibres manufactured on the basis of primary preforms according to Example 1 is lower along the larger part of their length than the attenuation of optical fibres obtained from primary preforms manufactured according to Example 2. More in particular, in the part approximately between longitudinal positions "−150" and "−50" the attenuation at 1385 nm for optical fibres obtained from primary preforms manufactured according to Example 1 is on average lower than the attenuation of optical fibres obtained from primary preforms manufactured according to Example 2.

According to the present inventors it can be concluded from the results shown in FIGS. 3 and 4 that it is possible to reduce the amount of incorporated hydroxyl groups in a primary preform manufactured by means of an internal vapor deposition process in comparison with a method according to the prior art whilst using the same amount of fluorine dopant in the deposited glass. To that end the first concentration of fluorine-containing compound must be set higher than the second concentration, whilst the total amount of fluorine-containing compound that is added in a stroke during the internal vapor deposition process is maintained at the same level.

According to the inventors it can also be concluded that it is possible to reduce the attenuation caused by Rayleigh scattering in a primary preform in comparison with a method according to the prior art whilst the amount of incorporated hydroxyl groups in the glass remains unchanged. To that end the first concentration must be set higher than the second concentration, whilst the total amount of fluorine-containing compound that is added in a stroke during the internal vapor deposition process is reduced.

Finally it can be concluded that the first and the second concentration of fluorine-containing compound can be set so that the amount of hydroxyl groups incorporated in the glass is substantially constant, seen along the length of a primary preform, in comparison with a method according to the prior art, in which the concentration of fluorine-containing compound is not dependent on the direction of movement of the reaction zone.

Although the examples relate to gradient index multimode optical fibres, the present invention is by no means limited to such optical fibres. The present invention can be used with every type of optical fibre that is manufactured by means of an internal vapor deposition process. The present invention is in particular suitable for single-mode fibres, because the 1385 nm wavelength is one of the possible wavelengths at which such a fibre is used in a communication network.

In the embodiment in which a primary preform for optical fibres is manufactured in which the optical fibre exhibits a radial refractive index profile comprising several concentric layers (also referred to as "shells"), which may or may not have different refractive index values, the present invention can be applied to one or more of the corresponding concentric layers in the primary preform during the internal vapor deposition process.

The invention claimed is:

1. A method for manufacturing a primary preform for optical fibres using an internal vapor deposition process, comprising the steps of:
   i) providing a hollow glass substrate tube having a supply side and a discharge side,
   ii) surrounding at least part of the hollow glass substrate tube by a furnace,
   iii) supplying doped or undoped glass-forming gases to the interior of the hollow glass substrate tube via the supply side thereof,
   iv) creating a reaction zone in which conditions are created such that deposition of glass will take place on the interior of the hollow glass tube, and
   v) moving the reaction zone back and forth along the length of the hollow glass substrate tube between a reversal point located near the supply side and a reversal point located near the discharge side of the hollow glass substrate tube, wherein, during at least part of step v), the gas flow comprises a first concentration of fluorine-containing compound when the reaction zone is moving in the direction of the discharge side, wherein the gas flow comprises a second concentration of fluorine-containing compound upon movement of the reaction zone in the direction of the supply side following movement thereof in the direction of the discharge side, wherein the first concentration of fluorine-containing compound is different from the second concentration of fluorine-containing compound during at least part of step v), wherein the deposition of glass layers on the interior of the substrate tube takes place continuously during deposition and during the concentration changes of the fluorine-containing compound dependent on the direction of the movement of the reaction zone, and wherein a proportion R, viz. the quotient of the first concentration of fluorine-containing compound and the second concentration of fluorine-containing compound in the gas flow, is set so that the proportion R is within the range $1<R<100$.

2. A method according to claim 1, wherein the first concentration of fluorine-containing compound is higher than the second concentration of fluorine-containing compound.

3. A method according to claim 1, wherein the fluorine-containing compound is free of hydrogen atoms and is selected from the group consisting of the compounds $CF_4$, $C_2F_6$, $C_4F_8$, $CCl_2F_2$, $SiF_4$, $Si_2F_6$, $SF_6$, $NF_3$, $F_2$ or a mixture of two or more of these compounds.

4. A method according to claim 3, wherein the fluorine-containing compound is $C_2F_6$ and/or $C_4F_8$.

5. A method according to claim 1, wherein the gas flow further comprises at least one dopant selected from the group consisting of germanium, nitrogen, boron, titanium, phosphorus, and aluminium.

6. A method according to claim 1, wherein the first concentration of fluorine-containing compound in the gas flow is set so that the refractive index of the deposited glass is reduced by less than $4 \times 10^{-3}$.

7. A method according to claim 1, wherein the first concentration of fluorine-containing compound in the gas flow is set so that the refractive index of the deposited glass is reduced by more than $0.1 \times 10^{-3}$.

8. A method according to claim 1, wherein the reaction zone moves at a speed of 5-40 m/min in step v).

9. A method according to claim 1, wherein the reaction zone in step iv) is a plasma.

10. A method according to claim 1, wherein the furnace is set at a temperature of 800-1200° C. in step v).

11. A method for manufacturing a final preform for optical fibres, comprising the steps of:
   i) manufacturing a primary preform according to claim 1,
   ii) collapsing the primary preform obtained in step i) into a solid primary preform, using a heat source,
   iii) optionally depositing an additional amount of glass on the exterior of the solid primary preform so as to form the final preform.

12. A method for manufacturing an optical fibre, comprising the manufacturing of a final preform for optical fibres according to claim 11, followed by the steps of heating one end of the final preform and drawing the optical fibre therefrom.

13. A method according to claim 1, wherein the proportion R, viz. the quotient of the first concentration of fluorine-containing compound and the second concentration of fluorine-containing compound in the gas flow, is set so that the proportion R is within the range $1<R<10$.

* * * * *